United States Patent [19]
Cliche et al.

[11] Patent Number: 5,194,237
[45] Date of Patent: Mar. 16, 1993

[54] TIC BASED MATERIALS AND PROCESS FOR PRODUCING SAME

[75] Inventors: Gilles Cliche, Boucherville; Serge Dallaire, Longueuil, both of Canada

[73] Assignee: National Research Council of Canada, Ottawa, Canada

[21] Appl. No.: 686,936

[22] Filed: May 20, 1991

[30] Foreign Application Priority Data

Apr. 23, 1990 [CA] Canada .................................. 2015213

[51] Int. Cl.⁵ ............................................. C01B 31/34
[52] U.S. Cl. .................................................. 423/440
[58] Field of Search ........................... 75/10.25, 10.18; 423/440; 420/417–420

[56] References Cited
U.S. PATENT DOCUMENTS 3,019,084 1/1962 Amstein .............................. 423/440
3,106,456 10/1963 Ripley ................................. 423/440
3,161,472 12/1964 Scott ................................... 423/440

Primary Examiner—Peter D. Rosenberg

[57] ABSTRACT

A process for synthesizing TiC composite materials containing a fine dispersion of TiC crystals in a metallic matrix. The matrix may contain one or more of metals selected from Al, Co, Cr, Cu, Fe, Mo, Ni and Ti. The process comprises rapid heating of a mixture of titanium alloys with carbon, preferably by arc melting or thermal spraying. This rapid heating step is also effective when the starting materials contain titanium, other metals and carbon.

15 Claims, 3 Drawing Sheets

TIC BASED MATERIALS AND PROCESS FOR PRODUCING SAME

FIELD OF THE INVENTION

This invention relates to the production of titanium carbide based materials and more particularly to the production of titanium carbide based composite materials for coatings and parts. The composite materials can also be obtained in a powder form. The invention also relates to the production of titanium carbide composite powder and titanium carbide crystals.

BACKGROUND OF THE INVENTION

Titanium carbide (TiC) exhibits high hardness (7–10 RH, or 3200 Kg$_f$/mm$^2$ with 50 g load), a low coefficient of friction, a high melting point (3170° C.) and a good resistance to corrosion. These properties as well as high thermal conductivity makes TiC particularly suitable for many applications such as parts in mining equipment (coal chutes, slurry conveyors, mill rolls), and in earth moving equipment (cutter blades), self sharpening edges, metal machining tools, etc.

TiC powders and coatings can be obtained in pure form or in a composite form. The composite is a dispersion of TiC particles in a metal matrix, the metals being preferably one or more selected from the group of Al, Co, Cr, Cu, Fe, Mo, and Ni.

TiC has thus far been mainly produced by directly reacting titanium or titanium dioxide with carbon in a resistance furnace or an induction furnace, usually under a protective atmosphere. Another TiC production method is a so-called auxiliary metal bath AMB) process, wherein iron or steel scrap is mixed with titanium, ferrotitanium or titanium oxide and melted in a graphite crucible, with an optional additional carbon charge, under vacuum or in hydrogen atmosphere. The TiC is then recovered by leaching the solidified melt. The method is described in U.S. Pat. No. 2,515,463.

Powdered TiC is obtained by grinding the product of a known TiC production method.

Composite TiC powders are usually produced for thermally sprayed composite coatings. They are obtained by combining previously produced pure TiC powders and a powdered metallic substance. Liquid phase processes giving metal-coated TiC powders include electrolytical and hydrometallurgical processes such as the Sherritt Gordon autoclave method. Composite powders can also be obtained by gas phase deposition and by various agglomeration techniques using organic binders and by micropelletizing methods such as dispersion spray drying. Thermal post-treatments such as sintering are often used to improve and stabilize the quality of the micropellets and other composite powders.

TiC composite parts are generally obtained by various powder metallurgy techniques such as hot pressing, hot isostatic pressing, infiltrating, sintering, etc., using TiC powders in combination with metallic powders or using composite TiC powders, or both.

TiC coatings can be obtained by chemical vapour deposition (CVD) processes such as plasma activated CVD, ion plating, sputtering, etc. Hard-facing processes such as carbide particle injection process by laser-melting, electric contact sinter bonding and plasma-transferred arc (PTA) processes are also used. Plasma spraying is the most commonly applied hard-facing technique for TiC or TiC-based composites. Plasma spraying of TiC and of TiC-based composites uses previously produced TiC powders, alone or mixed with metallic powders respectively.

None of the currently known processes can produce TiC-based composite materials containing a fine uniform dispersion of TiC in the preferred elements—Al, Co, Cr, Cu, Fe, Mo, Ni and alloys thereof. What can be produced thus far is a random mixture of TiC particles with a metallic substance. It is desirable that the size of TiC crystals, uniformly distributed throughout the metallic matrix, be fine (less than ca 20 μm) to very fine (less than 1 μm). The existing processes can produce relatively coarse TiC particles, much larger than 20 micrometers in size, which then require grinding for any particle size refinement.

Exemplary methods of preparing titanium carbide are also described in Canadian Patents No. 1,072049 (Perugini) and 894,138 (Swaney) and in U.S. Pat. No. 4,161,512 (Merzhanov et al.). However, none of these deals with the problem of making a composite TiC-based material with fine-sized TiC crystals, distributed uniformly in a metal matrix. The Merzhanov et al patent uses a so-called self-propagating synthesis (SHS) wherein the starting materials are carbon and titanium, both finely divided. The exothermic reaction therebetween produces relatively coarse titanium carbide with the particle size predominantly in the 10–60 micron range. The Canadian patents propose to react, in a plasma furnace, titanium or titanium halide with compounds of a halogen and carbon, or methane. The resulting titanium carbide, indeed very fine sized, is not in composite form.

Dallaire et al. (U.S. Pat. No. 4,673,550) proposed a somewhat different process for obtaining titanium boride-based composite materials. The patent does not refer to titanium carbide. The process comprises reacting mixtures of titanium alloys with boron or ferroboron by effecting an exothermic reaction therebetween or by heating or melting. Hard-facing techniques may be employed to form TiB$_2$ composite overlays according to that process.

As mentioned hereinabove, composite TiC powders are until now produced, e.g., for thermally sprayed composite coating, by combining previously produced TiC powder and a powdered metallic substance selected from the above-defined group of metals. Such coatings using these TiC-based mixtures and produced by various hard-facing techniques still give coarse coating structures with the carbide unevenly dispersed throughout the coating matrix.

It should be borne in mind that TiC does not always appear in stoichiometric form with the atomic ratio 1:1. Due to crystalline defects, the carbon content in the compound may vary. Therefore, this compound may be represented more precisely as Ti$_x$C$_y$ but for the purpose of this description, the formula TiC will be used throughout.

SUMMARY OF THE INVENTION

It is an object of the present invention to provide a process for synthesizing titanium carbide.

It is a further object of the invention to provide a process for producing TiC-based composite materials containing fine TiC particles or crystals (less than 20 μm in size) dispersed in a metallic matrix.

It is another object of the invention to produce titanium carbide-based composite materials in the form of powders, coatings or parts.

According to one aspect of the invention, there is provided a process for producing TiC-based composite materials consisting of fine TiC crystals less than about 20 μm in diameter evenly dispersed in a metallic phase. The process comprises the following basic steps:

providing a mixture of a titanium bearing alloy with carbon, the alloy comprising of at least one auxiliary metal selected from the group consisting of Al, Co, Cr, Cu, Fe, Mo and Ni, and rapidly heating the mixture at a rate of at least about 100° C./s above the melting point of the solution formed by titanium and the auxiliary metal at a temperature sufficient to synthesize TiC.

In another aspect of the invention, the titanium bearing alloy is substituted by a non-alloyed mixture of titanium and at least one auxiliary metal selected from the above-defined group, the non-alloyed mixture being mixed with carbon and subjected to the rapid heating.

Preferably, the components of the mixtures in both aspects of the invention are provided in comminuted form and mixed substantially uniformly prior to further treatment. Depending on the subsequent method of heating, the mixtures are preferably agglomerated, compacted or consolidated prior to the heating step.

The rapid heating causes the mixture to melt within a relatively short time, in the range from a fraction of a second to a few minutes. Such rapid heating can be achieved by way of, for example, arc, electron beam and laser melting; thermal spraying (flame spraying, plasma spraying, induction coupled or radio-frequency plasma deposition); plasma transferred arc deposition.

Preferably, the rapid heating is followed by rapid solidification. The latter is defined as having a solidification, or cooling, rate higher than 100° C./second.

As a result of the steps of the invention, there is obtained a TiC-based composite material consisting of fine TiC crystals dispersed substantially uniformly in a metallic matrix, or phase, the matrix (phase) being derived from the metallic elements previously alloyed with titanium or mixed with titanium and carbon.

The synthesis of TiC which takes place during the rapid heating step, is promoted through the formation of an auxiliary metal bath which is a solution of molten titanium and the auxiliary metal or metals selected. The reaction can be expressed generally as;

$$a(Me1_x Me2_y \ldots Mej_j Ti_z) + b(C) \rightarrow c(Ti_r C_s) + d(Me1_u Me2_v \ldots Me1_k Ti_w) + e(C) \quad (1)$$

where
a,b,c,d and e are mole fractions
x,y,j, z, r, s, u, v, k, and w are atomic ratios
$(Me1_x Me2_y \ldots Mej_j Ti_z)$, is the global atomic composition of the reactant metals
$(Me1_u Me2_v \ldots Me1_k Ti_w)$ is the global atomic composition of the matrix and where:

x+y+...j+z=1.

u+v+...k+w=1

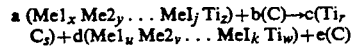

e=b−c

Values of (x,y ... j and z) may vary between 0.01 and 0.99 and preferably correspond to the composition at which the lowest melting temperature of the alloy or compound is attainable. Generally this corresponds to the eutectic composition and eutectic temperature. Me refers to metals, preferably Al, Co, Cr, Cu, Fe, Mo and Ni. In particular, the reaction can be expressed by the formula where:

where: x+y=1, c=b−ay, d=ax
wherein no excess carbon is introduced into the process.

DETAILED DESCRIPTION OF THE INVENTION

Figure 1:
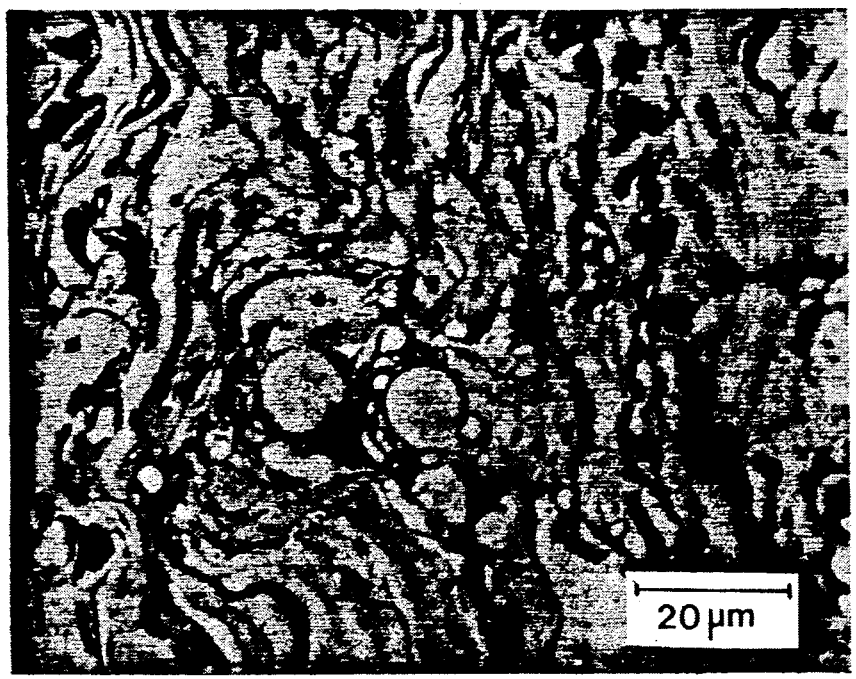
FIG. 1 is a microphotograph showing a TiC composite coating obtained by plasma spraying according to the invention.

As mentioned hereinabove, the process of the invention can produce composite powders, parts or coatings. While the basic steps of the invention remain unchanged for these particular products, the secondary steps will be selected accordingly. Practical embodiments of the invention can be described as follows:

A. PRODUCTION OF TiC COMPOSITE POWDERS BY THERMAL SPRAYING

1). mixing selected amounts of fine powders of a titanium alloy or titanium-bearing mixture with other metals and of carbon (amorphous or crystalline);

2). optionally milling mixtures obtained in step 1);

3). agglomerating the mixtures using agglomeration techniques e.g. spray drying, mechanical agglomeration, crushing, granulating, pelletizing, cladding or coating; optionally sintering agglomerated particles;

4). thermal spraying agglomerated particles from step 3) into water or another liquid.

5). optionally milling the powders from step 4).

B. PRODUCTION OF TiC POWDERS BY THERMAL SPRAYING

1), 2), 3), 4),—as in A;

5) leaching out the composite product to separate crystalline, fine or very fine and substantially pure TiC from the metallic phase.

C. PRODUCTION OF TiC COMPOSITE POWDERS BY ARC MELTING

1), 2) as in A and B.

3). compacting the mixtures of steps 1) and 2).

4). arc melting the mixture to synthesize TiC, preferably in an inert atmosphere 5). milling the product of step 4).

D. PRODUCTION OF TiC POWDERS BY ARC MELTING

1), 2), 3), 4)—as in C

5). leaching the product of 4) to produce crystalline, fine or very fine and substantially pure TiC particles.

The composite powders and TiC powders obtained by the above steps contain smooth and well-rounded TiC crystals substantially below 10 μm in size. This constitutes a clear advantage over corresponding furnace-synthesized products (TiC and composites) which, beside the coarseness of TiC particles, are usually highly contaminated by unreacted products such as carbon and phases such as undesirable intermetallics. These drawbacks make it mandatory to first separate TiC of the prior art composite products and then mix the thus obtained TiC with metallic powders.

TiC composite parts and TiC parts can be produced from the respective powders, using known powder metallurgy techniques e.g., pressing, forming, rolling, slip casting, injection moulding, sintering, infiltrating, hot isostatic pressing, forging, extruding, etc. TiC composite coatings can be obtained using hardfacing techniques such as plasma spraying, thermal spraying and plasma-transferred arc deposition.

E. PRODUCTION OF TiC COMPOSITE COATING

1), 2), 3)—as in A;

4). thermal spraying depositing agglomerated particles obtained through 1), 2) and 3) as in A onto a substrate. This operation is performed at a temperature sufficient to synthesize TiC. These agglomerated particles may also be deposited by various hardfacing techniques to obtain TiC composite coatings.

The coatings obtained according to the invention contain a uniform distribution of very fine TiC crystals throughout metallic matrix.

The invention is illustrated by way of the following examples:

EXAMPLE 1

In this example, a ferrotitanium alloy is used as the titanium source. The ferrotitanium is a hypoeutectic Ti-Fe alloy in a powder form, known as Chemalloy Ti-Loy 70 "HP" (trademark) having a following composition (wt %):
Ti—71.6
Al—0.45
V—0.12
C—0.12
Si—0.07
S—0.023
P—0.020
Fe—balance X-ray diffraction (XRD) analysis shows that a titanium solid solution phase and a FeTi intermetallic phase are the main constituents of this alloy.

Lonza KS 2.5 (trademark) graphite powder is used as the carbon source. This crystalline substance comprises 99.9 wt % carbon.

Iron powder, Quebec Metal Powder Atomet 95 (trademark), with particles less than 32 μm in size and containing 0.12 wt % carbon and 0.60 wt % oxygen was used. XRD analysis shows α-Fe peaks only.

Ti-Loy was ball-milled in methanol to prevent oxidation, for several hours to a 15 μm powder and allowed to dry in room temperature air before dry mixing with iron and graphite.

To produce a composite material containing 40 vol. % TiC, 10.0 grams of a mixture containing 3.30 g ferrotitanium (33.0%), 6.11 g iron powder (61.1%) and 0.59 g graphite (5.9%) were prepared. The mixture was pressed in a 1.0 cm by 5.5 cm die with an uniaxial force of 10,000 kg (18.2 $kg_f/mm^2$). The cold pressed blank was cut into samples weighing between 1.0 and 2.5 grams for melting.

The samples were melted in an electric arc furnace under a flowing argon atmosphere at a pressure of 65 kPa. The current applied was in the range 110 to 130 A. Voltage varied with the arc length between the mobile tungsten—2% thorium cathode and the samples staying on the water-cooled copper base anode. (The approximate temperature of the arc was 3000° C.).

XRD analysis of the product showed that titanium carbide and an iron-rich solid-solution phase were obtained. The time of arc melting was in the order of from a few seconds (for 1 g samples) to 30 sec (for 2.5 g samples) which is equivalent to a heating rate of about 100° C./s. The product consists mostly of primary TiC near-round crystals 1 to 10 μm in size embedded in a matrix constituted of iron and of an iron-TiC pseudoeutectic phase.

By varying the composition of starting material, products containing 25 to 83 vol. % TiC embedded in metallic matrix were obtained. The fine TiC near-round crystals were uniformly distributed in the matrix.

EXAMPLE 2

To obtain a plasma-sprayed coating containing 40 vol. % TiC, 79.9 grams of Lonza graphite was added to an aqueous slurry containing 387 g and 716 g of attritor-milled ferrotitanium and iron powder respectively. These materials were the same as in Example 1. To the slurry was also added 30.3 g of XUS 40303.00 Experimental Ceramic Binder (trademark, DOW) and 6.1 g of a Carbowax polyethyleneglycol 400 N.F. plasticizer. After the mixture was mechanically homogenized, it was spray-dried which resulted in an agglomerated powder. The powder was sieved to eliminate fines and sorted into two size fractions, −63+38 μm and −125+63 μm. The powder contained nominally 32.7 wt % ferrotitanium, 60.5 wt % Fe and 6.8 wt % Lonza graphite (atomic C/Ti ratio of 1.15); it was plasma sprayed onto low-carbon steel using the following process parameters:

| Working gas | Argon-Hydrogen (5 vol. %) |
|---|---|
| Gas flow rate (l/s) | 0.83–1.23 |
| Arc current (A) | 400–800 |
| Arc voltage (V) | 47–51 |
| Powder feed | |
| Spray rate (g/s) | 0.12 ± 0.01 |
| Carrier gas | Argon |
| Gas flow rate (l/s) | 0.087–0.252 |

The temperature of the process is estimated to be over 10,000° C.

This plasma spray process can produce very thick TiC composite coatings. XRD analysis of coatings after they were removed from the substrates and ground showed that TiC was synthesized during the plasma spraying and that iron was the main constituent of the matrix.

Nital attack revealed that the coating is composed of alternate laminated layers whose average hardness are 1400 kgf/mm² (50 g) and 575 kgf/mm² (50 g) respectively. Hard layers are believed to contain unresolved titanium carbides in an iron-rich phase matrix, soft layers are thought to be mostly constituted of iron and of an iron-TiC pseudoeutectic phase. The coating is fairly dense and possesses a homogeneous microstructure throughout the thickness.

FIG. 1 shows a typical microstructure of this sort of coating. It is not possible to distinguish the TiC crystals within the coating, so fine they are. Due to the rapid solidification involved in this process, the TiC crystals are submicronic.

Figure 2:
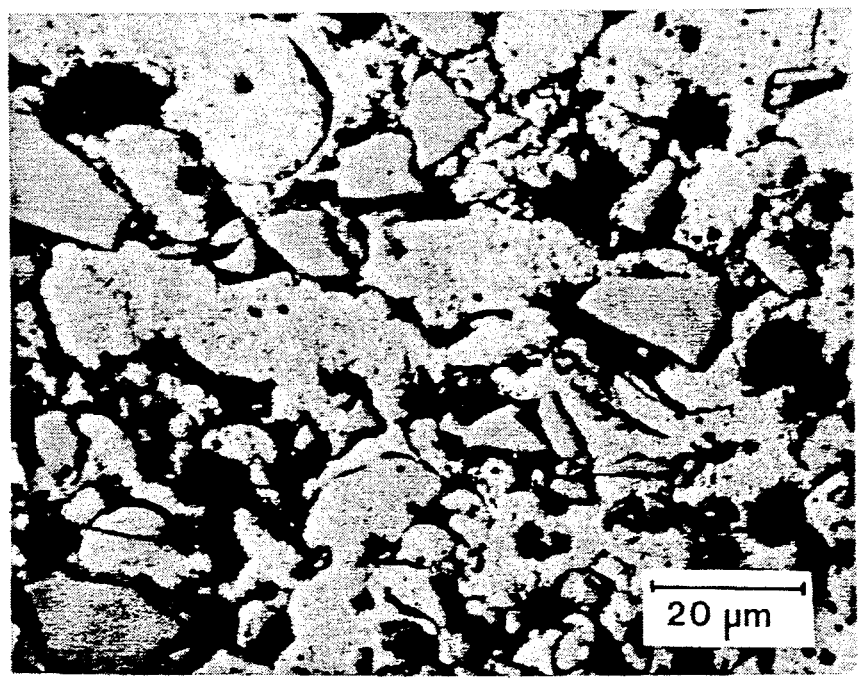
FIG. 2 is a microphotograph showing prior art TiC composite coating obtained by plasma spraying.

This plasma spray synthesized composite coating is thought to be particularly wear resistant due to its homogeneity and fine structure when compared to coatings obtained by means of spraying agglomerated mixtures of TiC powder and iron powder. The latter is less dense and less homogeneous, and the resulting TiC hard phases are coarser and their morphology is angular, as shown in FIG. 2.

EXAMPLE 3

To obtain a 60 vol. % TiC composite coating, 856 grams of ferrotitanium, 568 grams of iron and 177 grams of Lonza graphite were mixed as in Example 2. The materials were identical as in Example 1. Dow binder (41.0 g) and Carbowax plasticizer (8.2 g) were prepared, mixed and added to the mixture. The slurry was homogenized and spray-dried. The agglomerates containing nominally 53.5 wt % ferrotitanium, 35.6 wt % iron and 11.1 wt % Lonza graphite were sieved and sorted into two size fractions ($-63+38$ μm, $-125+63$ μm). These powders were then plasma sprayed using the same process parameters as described in Example 2.

The resulting coatings contain also alternate laminated layers whose hardnesses are 1520 kgf/mm² (50 g) and 600 kgf/mm² (50 g) respectively.

EXAMPLE 4

To produce an 83 vol. % TiC composite coating, 2920 g of attritor-milled ferrotitanium and 603 g of Lonza graphite (with an atomic C/Ti ratio of 1.15) were mixed together. A water-based slurry was prepared and 90.3 g of XUS 40303.00 Experimental Ceramic Binder (Dow) and 18.1 g of Carbowax plasticizer were added to the mixture. By repeating the same steps as in Examples 2 and 3, two powder fractions suitable for spraying were obtained. Using spraying parameters as in Example 2 and 3, dense and homogeneous TiC-based coatings were obtained. The properties of the coatings were similar as in Examples 2 and 3 except for the hardness of the TiC-richer layers, 1700 kgf/mm² (50 g).

EXAMPLE 5

To produce a composite material containing 83 vol. % of TiC, 8.48 g of ball-milled ferrotitanium and 1.52 g of #38 grade Fisher graphite were mixed, wetted by an aqueous solution containing polyethyleneglycol, dried and mortar ground to obtain a powder. This powder was pressed uniaxially in a die at 18.2 kgf/mm². The cold pressed specimen was sintered at 1040° C. for 1 hour in flowing argon and then arc melted as in Example 1.

According to XRD and microstructural analysis, the synthesized composite contains rounded TiC crystals with size mostly in the range from 2 to 10 μm in an iron-rich matrix.

EXAMPLE 6

A composite containing hard TiC phases was prepared by arc melting a mixture of 91.8 g of ball-milled ferrotitanium (as in Example 1) and 8.2 g of Fisher graphite. The atomic C/Ti ratio of the mixture was 0.50. The mixture was prepared according to the procedure as in Example 5.

Figure 3:
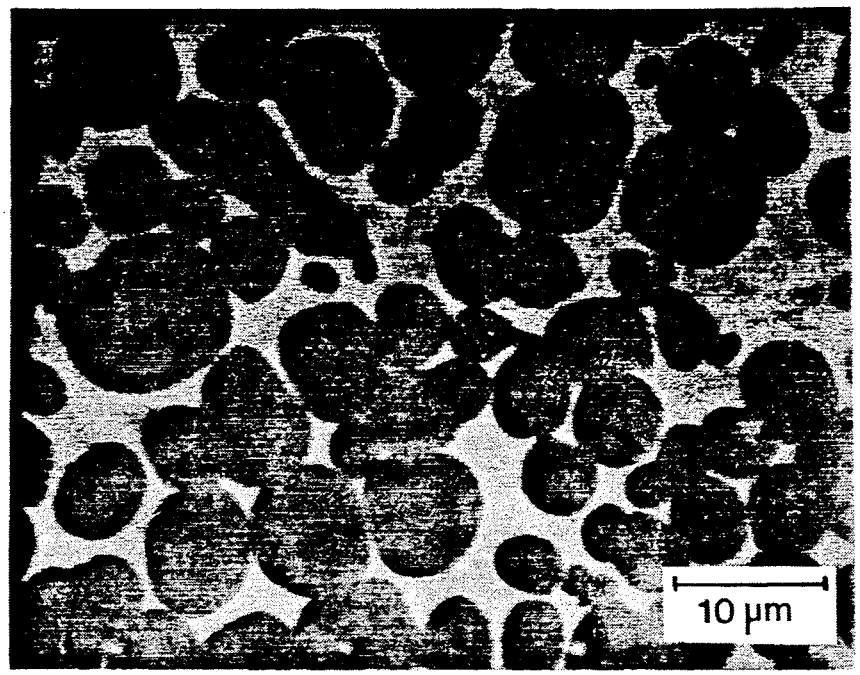
FIG. 3 is a microphotograph illustrating a TiC-Fe composite obtained by arc melting according to the invention.

Arc melting of the mixture resulted in a composite comprising 60 vol. % rounded hard TiC phases whose sizes are mostly in the range from 5 to 10 μm, as shown in FIG. 3. The are bound by a matrix composed of an iron-rich solution and an intermetallic FeTi phase.

EXAMPLE 7

A composite containing 50 vol. % TiC was prepared by a) cold-pressing to 18.2 kgf/mm² a mixture composed of 4.30 g of ferrotitanium, 4.92 g of iron powder and 0.77 g of Lonza graphite, and b) arc melting the green compact following the procedure described in Example 1.

EXAMPLE 8

A composite containing 50 vol. % TiC was prepared by using titanium and iron as starting materials instead of ferrotitanium and iron. A mixture composed of 3.08 g of 99.7% pure titanium (Atlantic Equipment Engineers), 6.15 g of iron and 0.77 g of Lonza graphite was cold-pressed at 18.2 kgf/mm² and the green compact was arc melted following the procedure described in Example 1.

The composites of Example 7 and 8 comprised rounded hard TiC phases with sizes in the range from 2 to 20 μm, uniformly dispersed in an iron matrix.

EXAMPLE 9

A composite containing hard TiC using titanium and nickel as starting materials instead of ferrotitanium and iron, was prepared by: (a) cold-pressing a mixture composed of 55.1 g 99.7% pure titanium, 31.1 g of 99.9% pure nickel (Alfa) and 13.8 g of Lonza graphite; (b) arc melting the green compact following the procedure described in Example 1.

Figure 4:
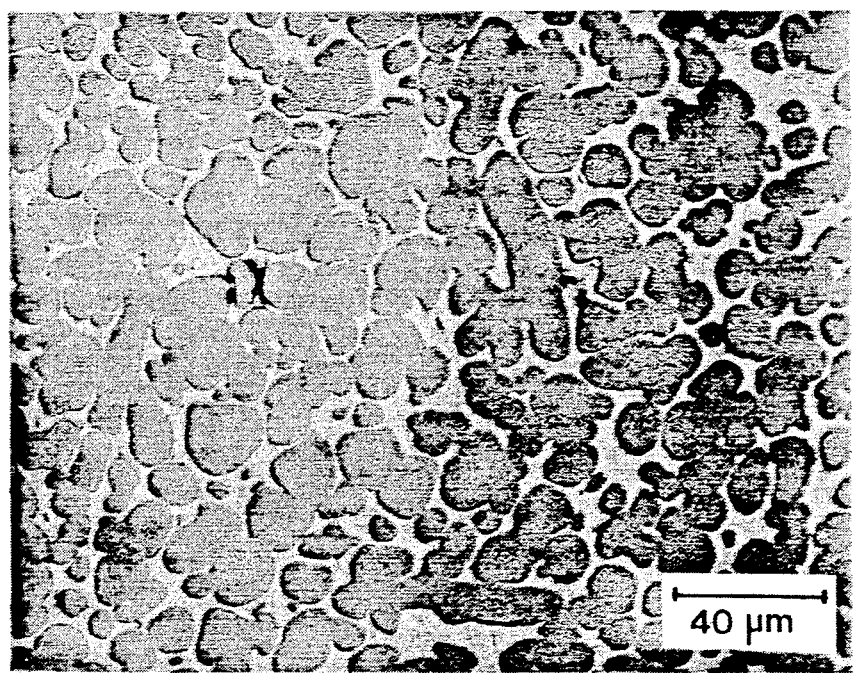
FIG. 4 is a microphotograph illustrating a TiC-Ni composite obtained by arc melting according to the invention.

After arc melting, composite was obtained comprising 80 vol. % rounded hard TiC phases whose sizes range from 6 to 20 μm bound by a matrix composed of a nickel-rich solid solution and a pseudoeutectic Ni-TiC phase, as shown in FIG. 4.

EXAMPLE 10

In this example is described the procedure for obtaining a composite powder containing fine TiC hard phases dispersed in an iron-rich matrix. A mixture comprising 8.48 g of ball-milled ferrotitanium and 1.52 g of #38 grade Fisher graphite powder was dry-mixed, wetted by an aqueous solution containing polyethyleneglycol, allowed to dry, mortar-milled and uniaxially cold-pressed at 18 kgf/mm² into 26×51×25 mm blocks. These blocks were broken up by a rotary disc mill and fragments were sieved and classified into two granulometric fractions ($-63+38$ μm, $-125+63$ μm). Under and oversize fragments were recycled. The powders were sintered at 1040° C. for 1 hour in flowing argon as in Example 5.

Sintered micropellets were injected into a plasma and the reacted product was collected in water. The plasma spraying equipment was operated with the following process parameters:

| Process parameters | |
|---|---|
| Working gas | Argon, Argon-Hydrogen (5 vol. %) Argon-helium (32 vol. %) |
| Gas flow rate (l/s) | 0.83–1.23 |
| Arc current (A) | 300–900 |
| Arc voltage (V) | 34–56 |
| Powder feed | |
| Spray rate (g/s) | 0.12 ± 0.01 |
| Carrier gas | Argon |
| Gas flow rate (l/s) | 0.094 |

Figure 5:
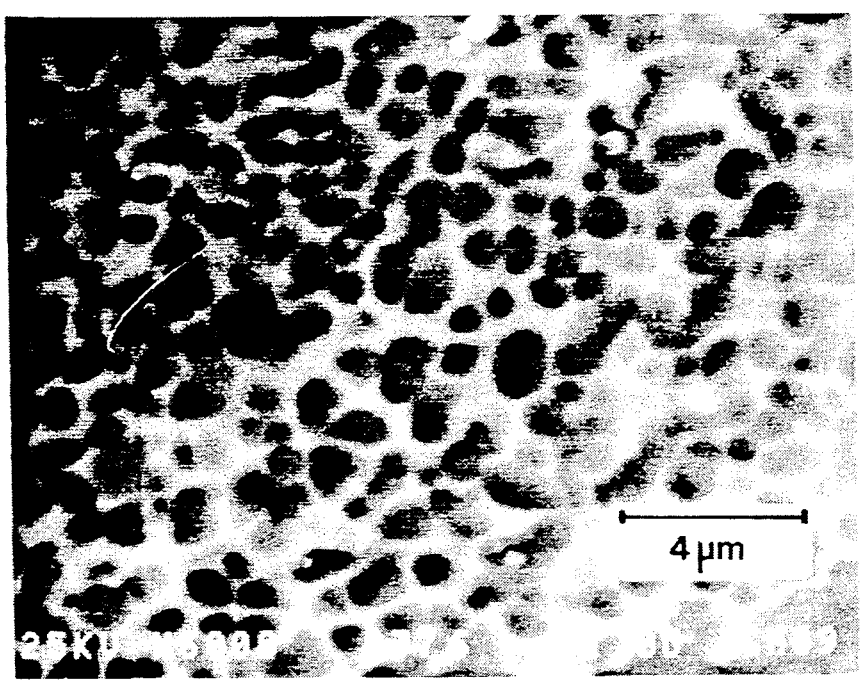
FIG. 5 is a microphotograph showing a composite TiC powder obtained according to the invention.

As shown in FIG. 5, the composite powders collected in water contain rounded hard TiC phases whose sizes range from 0.5 to 2 μm, bound by an iron-rich matrix. These very fine crystals compared to arc melted samples, result from the rapid solidification involved in this particular process.

The above examples are not intended to be limiting. A plurality of component combinations and various compositions is possible within the scope of the invention as defined by the appended claims.

We claim:

1. A process for producing TiC-based composite materials consisting of fine TiC crystals less than about 20 μm in diameter evenly dispersed in a metallic phase, which comprises, providing a mixture of a titanium bearing alloy with carbon, the alloy comprising at least one auxiliary metal selected from the group consisting of Al, Co, Cr, Cu, Fe, Mo and Ni, and heating the mixture rapidly at a rate of at least about 100° C./second above the melting point of the solution formed by titanium and the auxiliary metal at a temperature sufficient to synthesize TiC.

2. The process according to claim 1 wherein the heating is effected by on of the following methods: arc melting, electron beam melting, laser melting and plasma transferred arc deposition.

3. The process according to claim 1 wherein the heating is effected by thermal spraying.

4. The process according to claim 3 wherein the heating is effected by one of the following methods: flame spraying, plasma spraying, induction coupled plasma deposition or radio-frequency plasma deposition.

5. The process according to claim 1 wherein the heating is following by rapid solidification of the resulting metal at a rate higher than about 100° C./second.

6. The process according to claim 3 wherein the mixture is comminuted and agglomerated prior to the thermal spraying step.

7. A process for producing TiC-based composite materials consisting of fine TiC crystals less than about 20 μm in diameter evenly dispersed in a metallic phase, which comprises, providing a mixture of titanium, an auxiliary metal selected from the group consisting of Al, Co, Cr, Cu, Fe, Mo and Ni, and carbon, and heating the mixture rapidly at a rate of at least 100° C./second above the melting point of the solution formed by titanium and the auxiliary metal at a temperature sufficient to synthesize TiC.

8. The process according to claim 7 wherein the heating is effected by one of the following methods: arc melting, electron beam melting, laser melting and plasma transferred arc deposition.

9. The process according to claim 7 wherein the heating is effected by thermal spraying.

10. The process according to claim 7 wherein the heating step is followed by rapid solidification of the metal at a rate of at least 100° C./second.

11. The process according to claim 9 wherein the heating is effected by one of the following methods: flame spraying, plasma spraying, induction coupled plasma deposition or radio-frequency plasma deposition.

12. The process according to claim 9 wherein the mixture is comminuted and agglomerated prior to the thermal spraying step.

13. The process according to claim 1 wherein the mixture is comminuted and compacted or consolidated prior to the rapid heating step.

14. The process according to claim 7 wherein the mixture is comminuted and compacted or consolidated prior to the rapid heating step.

15. The process according to claim 1 which comprises densifying or consolidating the TiC composite materials containing a metallic phase to give TiC composite parts.

* * * * *